(12) United States Patent
Hyakutake et al.

(10) Patent No.: US 10,254,482 B2
(45) Date of Patent: Apr. 9, 2019

(54) MODE SCRAMBLER

(71) Applicant: ADAMANT CO., LTD., Tokyo (JP)

(72) Inventors: Yasuhiro Hyakutake, Kawaguchi (JP); Yoshitada Beppu, Tokyo (JP); Koji Horiguchi, Saitama (JP); Tadahisa Iikubo, Tokyo (JP)

(73) Assignee: ADAMANT CO., LTD., Tokyo (JP)

( * ) Notice: Subject to any disclaimer, the term of this patent is extended or adjusted under 35 U.S.C. 154(b) by 0 days.

(21) Appl. No.: 15/577,621

(22) PCT Filed: Jul. 15, 2016

(86) PCT No.: PCT/JP2016/071031
§ 371 (c)(1),
(2) Date: Nov. 28, 2017

(87) PCT Pub. No.: WO2017/014195
PCT Pub. Date: Jan. 26, 2017

(65) Prior Publication Data
US 2018/0164503 A1    Jun. 14, 2018

(30) Foreign Application Priority Data

Jul. 17, 2015  (JP) ................................. 2015-143172

(51) Int. Cl.
*G02B 6/14* (2006.01)
*G02B 6/46* (2006.01)
*G02B 6/00* (2006.01)

(52) U.S. Cl.
CPC .................. *G02B 6/14* (2013.01); *G02B 6/00* (2013.01); *G02B 6/46* (2013.01)

(58) Field of Classification Search
CPC ........................................................ G02B 6/14
See application file for complete search history.

(56) References Cited

U.S. PATENT DOCUMENTS 4,923,268 A * 5/1990 Xu ........................... B29C 65/68
264/1.25
4,932,748 A * 6/1990 Ricciardelli ............. G02B 6/14
385/147

(Continued)

FOREIGN PATENT DOCUMENTS

JP    S53-129664 A    11/1978
JP    S56-60908 U    5/1981

(Continued)

OTHER PUBLICATIONS

PCT/ISA/210, "International Search Report for International Application No. PCT/JP2016/071031" dated Oct. 4, 2016.

(Continued)

*Primary Examiner* — Sung H Pak
(74) *Attorney, Agent, or Firm* — Manabu Kanesaka

(57) ABSTRACT

Provided is a low-loss mode scrambler in which a steady mode distribution can be obtained in a short distance and switch to an entire mode distribution state is easy even when incident light is smaller than a numerical aperture of a fiber to be measured in a multimode fiber having a core diameter exceeding several tens of μm and a numerical aperture of 0.2 or more. One fiber 2 is wound around a plurality of bobbins 3a and 3b having a radius larger than a minimum bending radius of the fiber to form a bundle, and the fiber 2 is twisted by rotating the bobbins 3a and 3b to form a twisted portion 5, whereby it is possible to perform output of a steady mode from light incident on the fiber 2.

3 Claims, 3 Drawing Sheets

(56) References Cited

U.S. PATENT DOCUMENTS

| | | | | |
|---|---|---|---|---|
| 4,934,787 | A | * | 6/1990 | Ichimura .................. G02B 6/14 |
| | | | | 385/123 |
| 6,813,424 | B1 | * | 11/2004 | Dultz ..................... G02B 6/278 |
| | | | | 385/123 |
| 2012/0298847 | A1 | | 11/2012 | Hayashi et al. |

FOREIGN PATENT DOCUMENTS

| JP | S61-013803 U | 1/1986 |
|---|---|---|
| JP | H02-042407 A | 2/1990 |
| JP | H03-144337 A | 6/1991 |
| JP | 2000-0131548 A | 5/2000 |
| JP | 2005-099274 A | 4/2005 |
| JP | 2007-187774 A | 7/2007 |
| JP | 2012-247235 A | 12/2012 |
| JP | 2015-175958 A | 10/2015 |

OTHER PUBLICATIONS

PCT/ISA/237, "Written Opinion of the International Search Authority for International Application No. PCT/JP2016/071031" dated Sep. 26, 2016.

PCT/IB/373, "International Preliminary Report on Patentability for International Application No. PCT/JP2016/071031," dated Jan. 23, 2018.

PCT/ISA/237 "Written Opinion of the International Searching Authority for International Application No. PCT/JP2016/071031," dated Oct. 4, 2016.

* cited by examiner

MODE SCRAMBLER

RELATED APPLICATIONS

The present application is National Phase of International Application No. PCT/JP2016/071031 filed Jul. 15, 2016, and claims priority from Japanese Application No. 2015-143172, filed Jul. 17, 2015, the disclosure of which is hereby incorporated by reference herein in its entirety.

TECHNICAL FIELD

The present invention relates to a mode scrambler capable of arbitrarily changing a mode distribution between an incident light side and an outgoing light side of a mounted fiber.

BACKGROUND ART

Currently, mode scramblers for stabilizing outgoing light from a light source has been used in an insertion loss test of an optical fiber and an optical measuring instrument. Among these mode scramblers, there is a mode scrambler having a structure using a graded index (GI) fiber, described in Japanese Utility Model Application Laid-Open No. 61-013803 (hereinafter referred to as Patent Literature 1), as a basic mode scrambler. In this structure, microbending is generated by pressurizing a fiber core wire so as to enable attenuation of a higher-order mode distribution. Further, in Japanese Patent Application Laid-Open No. 2005-099274 (hereinafter referred to as Patent Literature 2), a small and inexpensive mode scrambler is provided by using an optical fiber wiring board in which a multimode optical fiber is laid on a circuit.

CITATION LIST

Patent Literature

Patent Literature 1: Japanese Utility Model Application Laid-Open No. 61-013803
Patent Literature 2: Japanese Patent Application Laid-Open No. 2005-099274

SUMMARY OF INVENTION

Technical Problem

While having the above-described effect, the mode scramblers described in Patent Literatures 1 and 2 use a structure that allows the higher-order mode distribution to leak out of the fiber, and has a problem that it is difficult to reproduce a steady mode distribution equivalent to that in the case of long distance propagation at the time of being used in a step index (SI) multimode fiber. More specifically, dispersion of the mode distribution is caused by a stress acting on the fiber, but the steady mode distribution equivalent to that obtained when propagated over a long distance is not reproduced. Further, a loss caused by light leaking out of the fiber is large. Further, in a shape of being continuously wound in the same direction as described in Patent Literature 2, the mode distribution varies depending on a wound diameter and a mode distribution of incident light, and it is difficult to output a stable steady mode distribution.

In regard to the above-described problems, an object of the invention described in the present application is to provide a mode scrambler that is capable of stably performing output of a steady mode distribution in a state where attenuation is suppressed in a short distance and arbitrarily changing the mode distribution in a multimode fiber.

Solution to Problem

For the above-described object, the invention described in a first aspect of the present invention is characterized in that a plurality of bobbins, arranged substantially in parallel in a radial direction at intervals, is bundled together, a fiber is wound therearound, and then, the bobbin is rotated. More specifically, a technical characteristic thereof is that the single fiber is used to be wound around the plurality of bobbins, linearly arranged in parallel in the radial direction, to form a bundle, and then, twisting is added to the fiber by mutually rotating the bobbins.

Further, the invention according to a second aspect of the present invention is characterized in that a core post is provided between the bobbins, and the fiber is wound around the core post while being twisted at the time of rotating the bobbin.

Advantageous Effects of Invention

According to the above technical characteristics, the invention described in the present application make it possible to obtain a steady mode distribution while suppressing attenuation of an SI multimode fiber to be used. This is because dispersion of the mode distribution occurs in the twisted portion of the fiber. That is, the mode scrambler of the present application has a structure in which a bending radius of the fiber is not reduced. Thus, when light is transmitted in the fiber, light does not leak to the outside, and the transmission can be performed in the state of suppressing a loss caused by the light leaking out of the fiber. Further, the dispersion of the mode distribution in the twisted portion is generated by mutually rotating the plurality of bobbins around which the single fiber is wound in the invention described in the present application. Thus, it is possible to output a steady mode distribution corresponding to characteristics of each SI fiber by changing the number of rotations of the bobbin. Here, the number of rotations also covers the number of rotations including decimal places, for example, 1.3 rotation or the like. Furthermore, the mode scrambler of the present application has a simplified basic structure of being merely wound around the bobbin and twisted in terms of its operation and configuration. Thus, it is possible to obtain a desired mode distribution at low cost at the time of using the SI multimode fiber by using the mode scrambler described in the present application. Incidentally, it is possible to obtain a similar effect to that of the case of changing the number of rotations even by changing the number of turns from the same technical viewpoint as the number of rotations.

Further, through suppression of the loss caused by the light leaking out of the fiber, it is possible to reproduce a mode distribution equivalent to the steady mode distribution when light is propagated over a long distance of the fiber in the invention described in the present application by making a numerical aperture of the incident light smaller than a numerical aperture of the SI multimode fiber used in the invention described in the present application. Further, through suppression of the loss caused by the light leaking out of the fiber, it is possible to output the steady mode distribution in a short distance even when the light incident to the fiber is smaller than the numerical aperture of the fiber. Further, it is possible to perform output in not only the steady mode distribution but also the entire mode distribution including a higher-order mode distribution by using an adjustment mechanism based on the number of turns and the number of rotations.

In addition to the effects according to the basic structure of the present application described above, it is possible to improve the versatility of the mode scrambler by using the invention described in the second aspect of the present application. That is, even for a fiber having a hard fiber cover and having a small maximum diameter, represented by an outdoor fiber, it is possible to impart the above-described effects by twisting the fiber in a state where a torsional diameter is enlarged using the core post described in the second aspect.

As described above, when the invention described in the present application is used, it is possible to provide the mode scrambler in which the steady mode distribution can be obtained in a short distance, and switch to the entire mode distribution is easy.

DESCRIPTION OF EMBODIMENTS

Figure 1:
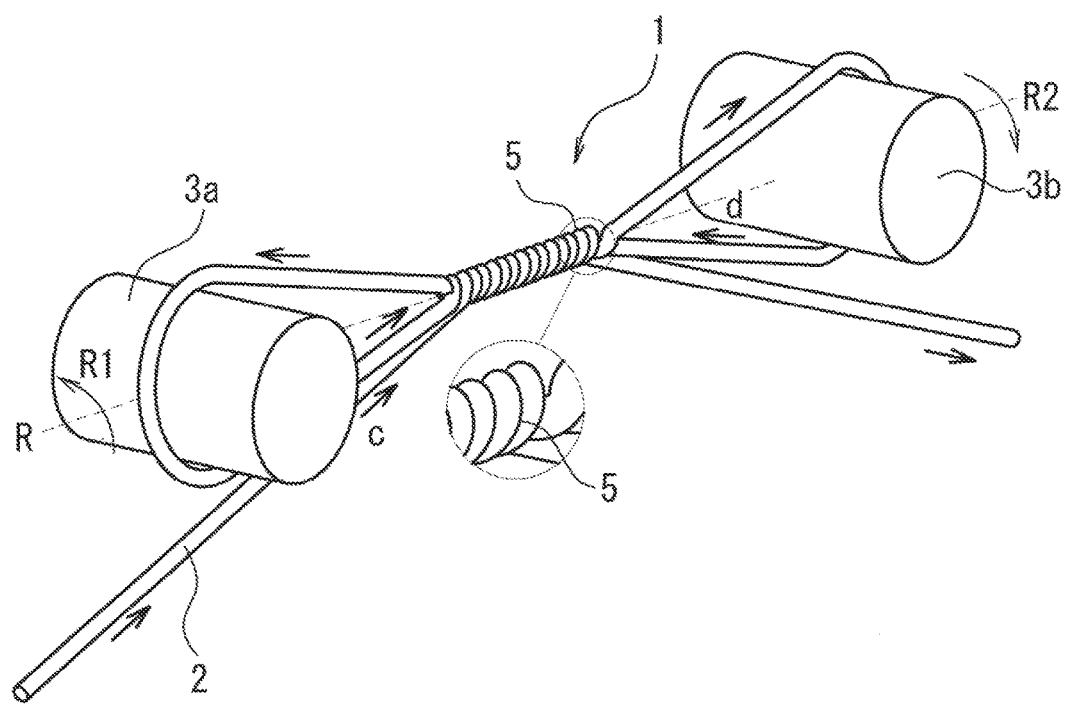
FIG. 1 is an overall perspective view of a mode scrambler used in the most preferable embodiment of the present invention.

Hereinafter, embodiments of a mode scrambler according to the present invention will be described with reference to FIGS. 1, 2, 3(a) and 3(b). Incidentally, common reference numerals are given to those functioning as the same parts with respect to reference numerals illustrated in the drawings.

FIGS. 1, 2, 3(a) and 3(b) illustrate an overall perspective view of a mode scrambler used in this embodiment, an explanatory side view of the mode scrambler, and a side view of another embodiment of the mode scrambler, respectively. Incidentally, a supporting structure of a bobbin and a fiber is not illustrated in the drawings.

Figure 2:
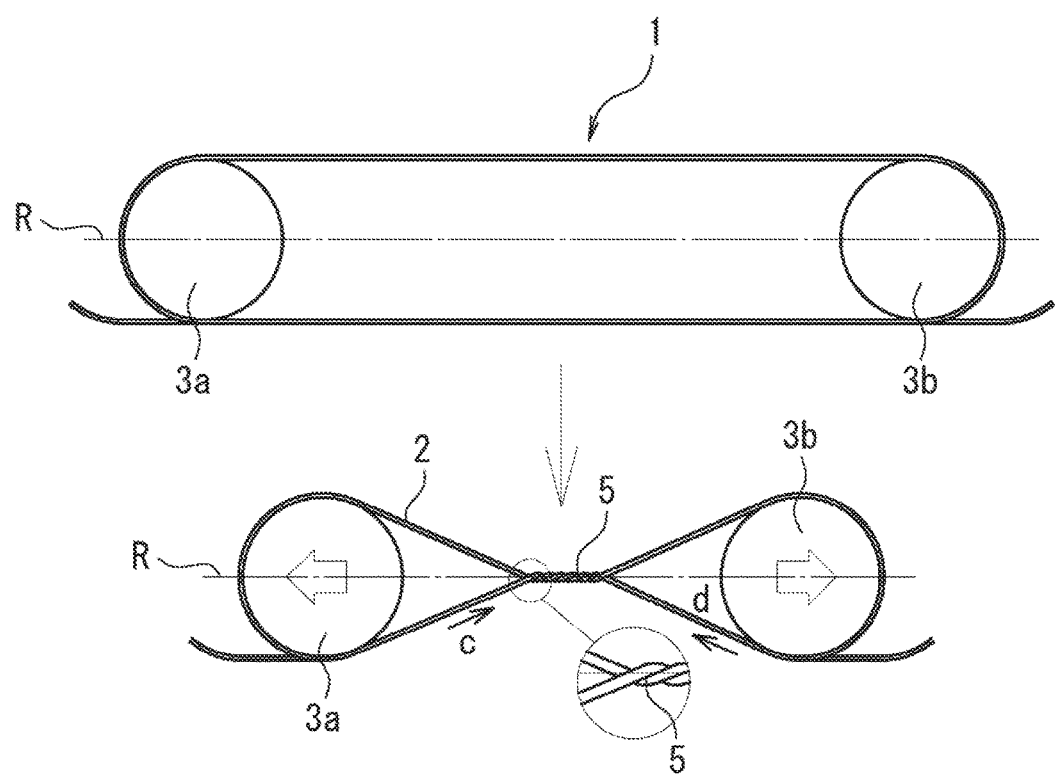
FIG. 2 is an explanatory side view of the mode scrambler illustrated in FIG. 1.

As understood from FIGS. 1 and 2, a mode scrambler 1 according to the present embodiment is provided with two bobbins 3a and 3b arranged in parallel in a radial direction, and is configured such that it is possible to wind the fiber 2 around these bobbins 3a and 3b. As illustrated in FIG. 1, for example, the single fiber 2 is wound around the bobbins 3a and 3b. Further, the bobbins 3a and 3b are configured such that it is possible to rotate the bobbins 3a and 3b coaxially in opposing directions opposite to each other, for example, the bobbin 3a in an R1 direction and the bobbin 3b in an R2 direction, using an axis R as a rotation axis thereof, in a state where the fiber 2 is wound therearound. Further, when the bobbins 3a and 3b are rotated in the opposing directions opposite to each other in this manner, the fiber 2, wound around these bobbins 3a and 3b, is twisted so that a twisted portion 5, twisted while a plurality of fibers is entangled with each other, is formed in the fiber 2.

The twisted portion 5 is formed between the bobbins 3a and 3b so that the plurality of fibers 2 is twisted while being entangled with each other. The twisted portion 5 is oriented in a direction having a predetermined angle with respect to a longitudinal direction in which the fiber 2 is disposed, and is formed such that the fiber 2 is spirally wound around with respect to the other fiber 2. Since the twisted portion 5 is formed as the fiber 2 is twisted as described above, a higher-order mode distribution transmitted through the fiber 2 is attenuated at the twisted portion 5, and it is possible to obtain output light with a stable steady mode distribution.

Incidentally, the fiber 2 used in the present embodiment is an SI multimode fiber having a core diameter exceeding several tens μm and a numerical aperture of 0.2 or more, and is incorporated in the mode scrambler 1 after being cut to have a length of 10 m or less. Further, the straight arrows in FIG. 1 indicate transmission paths of light in the fiber. Although the description is given using the example using SI multimode fiber in the present embodiment, a fiber other than this, such as a GI fiber, may be used as the fiber to be used, and is not limited to the above-described example.

Further, the mode scrambler 1 can change the mode distribution to be output depending on the number of rotations of the bobbins 3a and 3b by using such a structure. That is, as understood from FIG. 1, torsional stresses in opposite directions to each other act on the fiber 2 in both propagation directions of travel c, which is a direction in which the incident light is incident on the twisted portion 5 for the first time, and return d, which is a direction in which in which light is incident from an opposing direction to the travel c toward the twisted portion 5, that is, the light having passed through the twisted portion 5 at least once is incident to the twisted portion 5 again, in the mode scrambler 1 according to the present embodiment. Accordingly, the mode scrambler 1 of the present embodiment can generate dispersion of the mode distribution in the twisted portion 5 which is the twisted part without reducing a bending radius of the fiber 2. Further, since the light does not leak to the outside regarding the light transmission in the fiber, it is possible to perform the transmission in the state of suppressing the loss caused by the light leaking out of the fiber.

Further, the single fiber 2 is wound around the bobbins 3a and 3b, and the two bobbins 3a and 3b around which this fiber 2 has been wound are set to the state of being mutually rotated in the opposing directions opposite to each other, thereby generating the dispersion of the mode distribution in the fiber in the mode scrambler 1 of the present embodiment as understood from FIG. 2. Thus, it is possible to output the steady mode distribution corresponding to the characteristics of the fiber 2 by changing the number of rotations of the bobbins 3a and 3b. Further, the simplified structure, obtained only by winding the fiber 2 around the bobbins 3a and 3b and causing twist in the fiber 2 to form the twisted portion 5, is provided in the operation and configuration of the mode scrambler 1 of the present embodiment, thereby enabling the mode output, that is, the output of the steady mode distribution. Thus, the mode scrambler 1 as a whole can have an inexpensive configuration while improving practicality.

Figure 3:
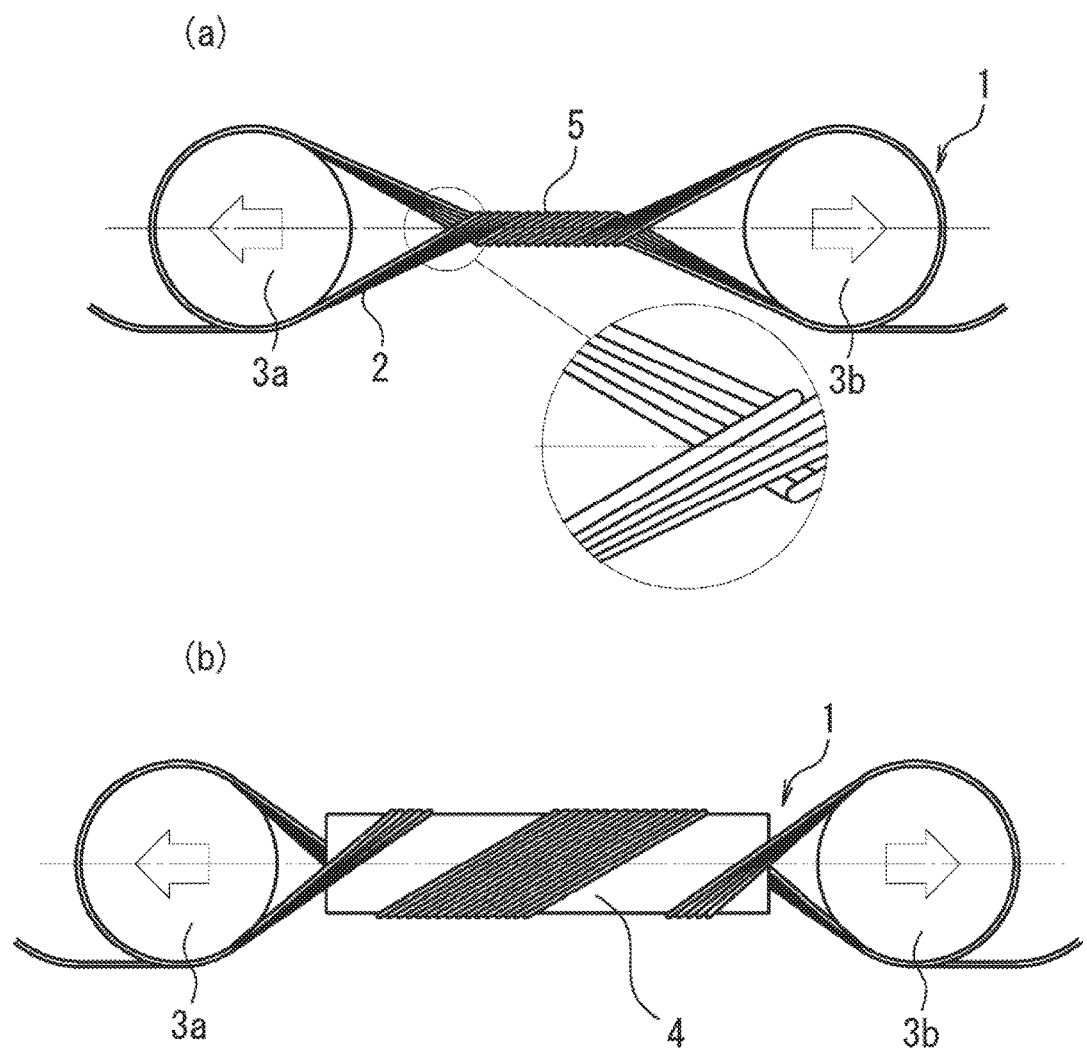
FIGS. 3(a) and 3(b) are side views according to another embodiment of the mode scrambler illustrated in FIG. 1.

Incidentally, from the same technical viewpoint as the number of times of twist as the number of times of twisting the fiber 2 in the twisted portion 5, even when it is configured such that the number of turns as the number of times of winding the fiber 2 around the two bobbins 3a and 3b is changed, it is possible to obtain various effects including the suppression of the loss caused by the light leaking out of the fiber as described above similarly to the case of changing the number of rotations as illustrated in FIG. 3(a). Further, the stress acting on the fiber 2 increases depending on a rotation angle of the bobbins 3a and 3b in this configuration, and thus, it is possible to output the steady mode distribution with a smaller torsional angle. Further, for a fiber having a hard fiber cover and having a small maximum diameter, represented by an outdoor fiber, it is possible to impart the same effects as the above-described structure illustrated in FIGS. 1 and 2 together with high general versatility by adopting the twisted structure using the core post 4 as illustrated in FIG. 3(b).

In addition to these effects, for example, in the multimode fiber having the core diameter exceeding several tens μm and the numerical aperture of 0.2 or more, it is possible to reproduce a mode distribution equivalent to the steady mode distribution when light is propagated over a long distance of the fiber 2 by making the numerical aperture of the incident light smaller than the numerical aperture of the fiber 2 even when the incident light is smaller than the numerical aperture of the fiber to be measured through the suppression of the loss caused by the light leaking out of the fiber in the invention described in the present application. Further, it is possible to perform output in not only the steady mode distribution but also the entire mode distribution including a higher-order mode distribution by using an adjustment mechanism based on the number of turns and the number of rotations.

As described above, when the mode scrambler 1 according to the present invention is used, it is possible to provide the mode scrambler 1 in which the steady mode distribution can be obtained in a short distance, and switch to the entire mode distribution is easy. Incidentally, only one example of the mode scrambler according to the present invention has been described as above, and the configuration may be changed as appropriate without departing from a gist of the present invention.

REFERENCE SIGNS LIST 1 mode scrambler
2 fiber
3a, 3b bobbin
4 core post
5 twisted portion
c, d light propagation direction in fiber
R axis

The invention claimed is:
1. A mode scrambler comprising:
   a plurality of bobbins arranged in a radial direction thereof with an interval therebetween, and
   a fiber wound around the plurality of bobbins, and having a twisted portion formed by rotation of the plurality of bobbins about an arranged direction thereof as an axis to thereby bundle the plurality of bobbins with the fiber, wherein portions of the fiber are entangled to form the twisted portion to apply a torsional stress to the fiber.
2. The mode scrambler according to claim 1, wherein the fiber is wound around a core post provided between the bobbins at a time of rotating the bobbins.
3. The mode scrambler according to claim 1, wherein the plurality of bobbins includes two bobbins, and
   the fiber is a single fiber wound around the two bobbins, and includes a first portion wound around one of the two bobbins, a second portion wound around the other of the two bobbins, and the portions of the fiber extending between the two bobbins, which are twisted together to form the twisted portion of the fiber.

* * * * *